United States Patent [19]
Kovacs et al.

[11] Patent Number: 5,347,303
[45] Date of Patent: Sep. 13, 1994

[54] FULL COLOR XEROGRAPHIC PRINTING SYSTEM WITH DUAL WAVELENGTH, SINGLE OPTICAL SYSTEM ROS AND DUAL LAYER PHOTORECEPTOR

[75] Inventors: Gregory J. Kovacs, Sunnyvale; G. A. Neville Connell, Cupertino, both of Calif.

[73] Assignee: Xerox Corporation, Stamford, Conn.

[21] Appl. No.: 349

[22] Filed: Jan. 4, 1993

[51] Int. Cl.⁵ ............... G03G 15/01; G01D 15/14
[52] U.S. Cl. ..................... 346/157; 346/160
[58] Field of Search ..................... 346/157, 160

[56] References Cited
U.S. PATENT DOCUMENTS

| | | | |
|---|---|---|---|
| 3,992,204 | 11/1976 | Taylor | 96/1.5 |
| 4,445,126 | 4/1984 | Tsukada | 346/108 |
| 4,521,504 | 6/1985 | Sakuma et al. | 430/57 |
| 4,728,983 | 3/1988 | Zwadlo et al. | 355/4 |
| 4,839,692 | 6/1989 | Shoji et al. | 355/211 |
| 4,963,900 | 10/1990 | Budd et al. | 346/160 |
| 4,977,417 | 12/1990 | Takanashi et al. | 346/160 |
| 5,006,868 | 4/1991 | Kinoshita | 346/157 |
| 5,089,908 | 2/1992 | Jodoin et al. | 346/108 X |
| 5,221,954 | 6/1993 | Harris | 346/157 X |
| 5,223,906 | 6/1993 | Harris | 346/157 X |

*Primary Examiner*—George H. Miller, Jr.
*Attorney, Agent, or Firm*—William Propp

[57] ABSTRACT

A full color xerographic printing system, either double pass or single pass, with a single polygon, single optical system Raster Output Scanning (ROS) system has a dual wavelength laser diode source for the ROS which images the dual beams at a single station as closely spaced spots or at two stations as closely spaced spots on a dual layer photoreceptor with each photoreceptor layer sensitive to or accessible by only one of the two wavelengths.

16 Claims, 7 Drawing Sheets

| PROCESS STEPS | 1st PASS | 2nd PASS |
|---|---|---|
| Charge | ON | ON |
| Imagewise Expose | ON | ON |
| CAD K | IN (OR ON) | OUT (OR OFF) |
| DAD Y | IN (OR ON) | OUT (OR OFF) |
| Flood B | ON | OFF |
| DAD C | OUT (OR OFF) | IN (OR ON) |
| Flood R | OFF | ON |
| DAD M | IN | IN |
| Pretransfer | OFF | ON |
| Transfer | OFF | ON |
| Cleaner | OUT (OR OFF) | IN (OR ON) |
| Erase Lamp | ON | ON |

FULL COLOR XEROGRAPHIC PRINTING SYSTEM WITH DUAL WAVELENGTH, SINGLE OPTICAL SYSTEM ROS AND DUAL LAYER PHOTORECEPTOR

BACKGROUND OF THE INVENTION

This invention relates to a full color xerographic printing system, either double pass or single pass, with a single polygon, single optical system Raster Output Scanning (ROS) system, and, more particularly, to a dual wavelength laser diode source for the ROS which images the dual beams at a single station as closely spaced spots or at two stations as closely spaced spots on a dual layer photoreceptor with each photoreceptor layer sensitive to only one of the two wavelengths or with one photoreceptor layer sensitive to both wavelengths and located beneath the other layer which absorbs one of the two wavelengths and permits only the second wavelength of light to reach the lower layer. Hence, although sensitive to both wavelengths, the lower layer is only accessed by one of the two wavelengths.

In xerographic printing (also called electrophotographic printing), a latent image is formed on a charged photoreceptor, usually by raster sweeping a modulated laser beam across the photoreceptor. The latent image is then used to create a permanent image by transferring and fusing toner that was electrostatically attracted to the latent image, onto a recording medium, usually plain paper. While other methods are known, the most common method of sweeping the laser beam is to deflect it from a rotating mirror. A multifaceted, rotating polygon mirror having a set of related optics can sweep the beam or sweep several beams simultaneously. Rotating polygon mirrors and their related optics are so common that they are generically referred to as ROSs (Raster Output Scanners), while printers that sweep several beams simultaneously are referred to as multispot printers.

When a xerographic printer prints in two or more colors, it requires a separate latent image for each color printed, called a system color. Color prints are currently produced by sequentially transferring overlapped images of each system color onto an intermediate transfer belt that is passed multiple times, once for each system color, over the photoreceptor. The built-up image is then transferred to a single recording medium and fused. Such printers are called multiple pass printers.

Conceptually, one can build up multiple colors on a photoreceptor or intermediate transfer belt that is passed through the system only once, in a single pass, by using a sequence of multiple xerographic stations, one for each system color. The built-up image on the photoreceptor or ITB can be transferred to a recording medium in a single pass. Additionally, tandem xerographic stations can sequentially transfer images directly to the recording medium in a single pass. Such a printer, called a multistation printer, would have a greater output than a multipass printer operating at the same raster sweep speed because the rasters for each color are operating simultaneously in the single pass printer. However, the introduction of multistation printers has been delayed by 1) cost problems, at least partially related to the cost of multiple xerographic stations and the associated ROSs, and 2) image quality problems, at least partially related to the difficulty of producing similar spots at each imaging station and subsequently registering (overlapping) the latent images on the photoreceptor(s), transfer medium(s) or recording medium(s).

In the practice of conventional bi-level xerography, it is the general procedure to form electrostatic latent images on a xerographic surface by first uniformly charging a charge retentive surface such as a photoreceptor. The charged area is selectively dissipated in accordance with a pattern of activating radiation corresponding to desired images. The selective dissipation of the charge leaves a latent charge pattern on the imaging surface corresponding to the areas not exposed by radiation.

This charge pattern is made visible by developing it with toner by passing the photoreceptor past a single developer housing. The toner is generally a colored powder which adheres to the charge pattern by electrostatic attraction. The developed image is then fixed to the imaging surface or is transferred to a receiving substrate such as plain paper to which it is fixed by suitable fusing techniques.

Modern business and computer needs often make it advantageous and desirable to reproduce or print originals which contain two or more colors. It is sometimes important that the copy reproduced or printed also contain two colors.

Several useful methods are known for making copies having plural colors. Some of these methods make high quality images, however, there is need for improvements. In particular, it is desirable to be able to print images having two or more highlight colors rather than being limited to a single highlight color. It is also desirable to be able to produce such images in a single pass of the photoreceptor or other charge retentive surface past the printing process areas or stations.

One method of producing images in plural (i.e. two colors, black and one highlight color) is disclosed in U.S. Pat. No. 3,013,890 to W. E. Bixby in which a charge pattern of either a positive or negative polarity is developed by a single, two-colored developer. The developer comprises a single carrier which supports both triboelectrically relatively positive and relatively negative toner. The positive toner is a first color and the negative toner is of a second color. The method develops positively charged image areas with the negative toner and develops negatively charged image areas with the positive toner. A two-color image occurs only when the charge pattern includes both positive and negative polarities.

Plural color development of charge patterns can be created by the method disclosed by F. A. Schwertz in U.S. Pat. No. 3,045,644. Charge patterns are developed of both a positive and negative polarity. The development system is a set of magnetic brushes, one of which applies relatively positive toner of a first color to the negatively charged areas of the charge pattern and the other of which applies relatively negative toner to the positively charged areas.

U.S. Pat. No. 3,816,115 to R. W. Gundlach and L. F. Bean discloses a method for forming a charge pattern having charged areas of a higher and lower strength of the same polarity. The charge pattern is produced by repetitively charging and imagewise exposing an overcoated xerographic plate to form a composite charge pattern.

As disclosed in U.S. Pat. No. 4,403,848, a multi-color printer uses an additive color process to provide either partial or full color copies. Multiple scanning beams, each modulated in accordance with distinct color image signals, are scanned across the printer's photoreceptor at relatively widely separated points, there being buffer means provided to control timing of the different color image signals to assure registration of the color images with one another. Each color image is developed prior to scanning of the photoreceptor by the next succeeding beam. Following developing of the last color image, the composite color image is transferred to a copy sheet. In an alternate embodiment, an input section for scanning color originals is provided. The color image signals output by the input section may then be used by the printing section to make full color copies of the original.

Proposed prior art multistation printers have usually included individual ROSs (each comprised of separate polygon mirrors, lenses, and related optical components) for each station. For example, U.S. Pat. Nos. 4,847,642 and 4,903,067 to Murayama et al. involve such systems. Problems with these systems include the high cost of producing nearly identical multiple ROSs and the difficulty of registering the system colors.

A partial solution to the problems of multistation xerographic systems with individual ROSs is disclosed in U.S. Pat. No. 4,591,903 to Kawamura et al. The '903 patent, particularly with regards to FIG. 6, discusses a recording apparatus (printer) having multiple recording stations and multiple lens systems, but only one polygon mirror. With only one polygon mirror and associated drive motor, the cost of the system is reduced. However, differences in the lenses and mirror surfaces still could cause problems with color registration.

Another approach to overcoming the problems of multistation printers having individual ROSs is disclosed in U.S. Pat. No. 4,962,312 to Matuura et al. The '312 patent illustrates spatially overlapping a plurality of beams using an optical beam combiner, deflecting the overlapped beams using a single polygon mirror, separating the deflected beams using an optical filter (and polarizers or additional filters if more than two beams are used), and directing the separated beams onto associated photoreceptors. The advantage of overlapping the laser beams is a significant cost reduction since the ROS is shared.

However, an actual embodiment of the '312 apparatus would be rather complicated and expensive, especially if four system colors are to be printed. The use of optical beam combiners to overlap beams so that they have similar optical axes would be difficult, expensive, and time consuming. Obtaining similar sized spots on each photoreceptor would also be difficult as it would be difficult to establish the same optical path lengths for each beam. Finally, it would also be difficult to ensure that the latent images on the photoreceptors are registered. Each of these problems is at least partially related to the relative positions of the laser sources.

In U.S. Pat. No. 5,243,359, commonly assigned with the present application and herein incorporated by reference, the multiwavelength closely spaced diode laser sources of the ROS of the color printing system are passed through a common optical system including polygon and then separated by filters to address multiple xerographic stations simultaneously.

This concept enables savings in both space and cost in color applications since several optical systems are combined into one, for example in a four color system a single polygon ROS would be used instead of four.

The registration problems associated with color xerographic printing are addressed by the multiple wavelength single polygon with split beams from the point of view of scanning bow and wobble errors. The use of a single polygon and associated optical system should minimize relative scanning bow and wobble errors at the separate imaging stations.

This concept of a multiwavelength single polygon ROS addresses the general need for compact color printing systems to take advantage of the exploding color printing market. However there is still a strong need to reduce the size and complexity of color printing systems even further. There is also a need to improve the registration errors inherent in xerographic color printing systems which use tandem drums, intermediate transfer belts and multiple passes.

A single pass xerographic printing system does provide approximately twice the speed of a double pass xerographic printing system. A double pass xerographic printing system provides a more compact ROS and a smaller xerographic printing system architecture which avoids needless duplication of printing elements (i.e. developer stations).

It is an object of this invention to provide a dual wavelength beam laser source for a single polygon, single optics, ROS for use in a full color xerographic printing unit.

It is another object of this invention to provide a dual wavelength sensitive, dual layer photoreceptor for use with a single polygon, single optics, ROS in a full colorxerographic printing unit.

It is another object of this invention to provide a dual wavelength sensitive, dual layer photoreceptor xerographic printing system which can be either double pass or single pass.

SUMMARY OF THE INVENTION

In accordance with the present invention, a double pass or single pass color xerographic printing system with a single polygon, single optical system Raster Output Scanning (ROS) system has a dual wavelength laser diode source for the ROS which images the dual beams at a single station or at two stations as closely spaced spots on a dual layer photoreceptor with each photoreceptor layer sensitive to only one of the two wavelengths or each accessible to only one of the two wavelengths. Each layer of the photoreceptor is independently addressable and dischargeable by one of the two wavelengths of the laser diode light source. The laser diode light source may be either hybrid or monolithic. Alternate light sources which allow two wavelength laser beams to pass through the same single optics ROS may also be used. The light source may consist of one or more modulated beams at each of the two wavelengths. After exposure each of the resultant voltage levels on the photoreceptor is then developed with a different toner at successive development stations by appropriate choice of toner polarity and development biasing techniques.

The ability to independently discharge each layer in the photoreceptor on imaging and to effect imagewise discharge by blanket exposure between development steps allows a full color image to be made at high speed in a double or single pass.

Other objects and attainments together with a fuller understanding of the invention will become apparent and appreciated by referring to the following description and claims taken in conjunction with the accompanying drawings.

DESCRIPTION OF THE PREFERRED EMBODIMENT

Figure 1:
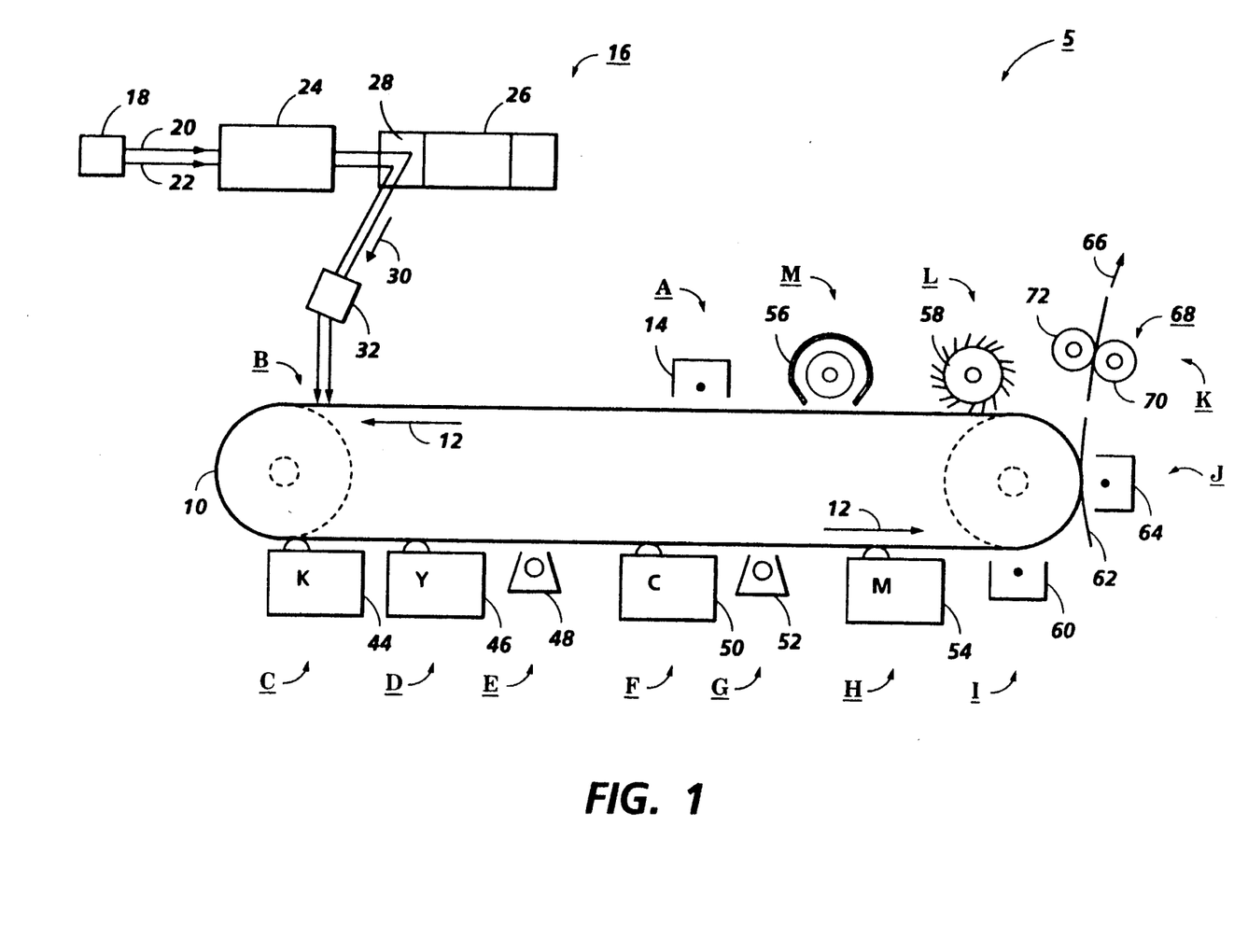
FIG. 1 is a schematic illustration of the cross-section side view of the double pass xerographic printing system.

Reference is now made to FIG. 1, wherein there is illustrated a double pass xerographic printing system 5 incorporating the invention which may utilize a charge retentive member in the form of a photoconductive belt 10 consisting of a photoconductive surface and an electrically conductive substrate and mounted for movement past a charging station A, an exposure station B, a first development station C, a second development station D, a first uniform exposure station E, a third development station F, a second uniform exposure station G, a fourth development station H, a pre-transfer charging station I, a transfer station J, a fusing station K, a cleaning station L and an erasure exposure station M. The belt 10 moves in the direction of arrow 12 to advance successive portions of the belt sequentially through the various processing stations disposed about the path of movement thereof for forming images in a double pass of the belt through all of the process stations. The belt 10 is entrained about a plurality of rollers (not shown), one of which can be used as a drive roller and the others of which can be used to provide suitable tensioning of the photoreceptor belt 10. A motor (also not shown) rotates the drive roller to advance the belt 10 in the direction of arrow 12. The drive roller can be coupled to the motor by suitable means such as a belt drive.

As can be seen by further reference to FIG. 1, initially successive portions of belt 10 pass through charging station A, where a corona discharge device such as a scorotron, corotron, or dicorotron, indicated generally by the reference numeral 14, charges the belt 10 to a selectively high uniform positive or negative potential, $V_0$. Any suitable control circuit, as well known in the art, may be employed for controlling the corona discharge device 14.

Next, the charged portions of the photoreceptor surface are advanced through exposure station B. At exposure station B, the uniformly charged photoreceptor or charge retentive surface 10 is exposed to a raster output scanning device 16 which causes the charge retentive surface to remain charged or to be discharged in accordance with the output from the scanning device. An electronic subsystem converts a previously stored image into the appropriate control signals for the ROS in an imagewise fashion.

The raster output scanner 16 can use a dual wavelength hybrid laser semiconductor structure 18 consisting of a 670 nm wavelength laser emitter such as a semiconductor structure of AIGaInP/GaAs and a 830 nm laser emitter such as a semiconductor structure of AlGaAs/GaAs, both laser emitter structures being known to those of ordinary skill in the art.

The different wavelength beams must be scanned over on top of each other on the photoreceptor to maintain registration and avoid misalignment. The beams may also be sagittally offset and still scanned on top of each other on different scans. The tangential offset of each laser emitter is generally given an upper limit of 300 $\mu$m since tangential offset does not introduce scan line bow. The effect of tangential offset is to require delay in the electronic modulation signals to one of the dual beams relative to the other since one beam lags the other during scanning across the photoreceptor. One or more beams can be emitted at each wavelength. The raster output scanner can also use a dual wavelength monolithic semiconductor laser structure 18 where generally the offset between the two lasers will be purely sagittal.

The dual wavelength laser structure provides a substantially common spatial origin for each beam. Each beam is independently modulated so that it exposes its associated photoreceptor in accordance with a respective color image.

In the raster output scanner 16, the two laser beams 20 and 22 from the laser structure 18 are input to a conventional beam input optical system 24 which collimates, conditions and focuses the beams onto an optical path such that they illuminate a rotating polygon mirror 26 having a plurality of facets 28. As the polygon mirror rotates, the facets cause the reflected beam to deflect repeatedly in the direction indicated by the arrow 30. The deflected laser beams are input to a single set of imaging and correction optics 32, which corrects for errors such as polygon angle error and wobble and focuses the beams onto the photoreceptor belt. The semiconductor laser beams are modulated by modulating the drive currents to each of the lasers.

As stated earlier, at exposure station B, the uniformly charged photoreceptor or charge retentive surface 10 is exposed to a raster output scanning device 16 which causes the charge retentive surface to remain charged or to be discharged in accordance with the output from the scanning device.

Figure 2:
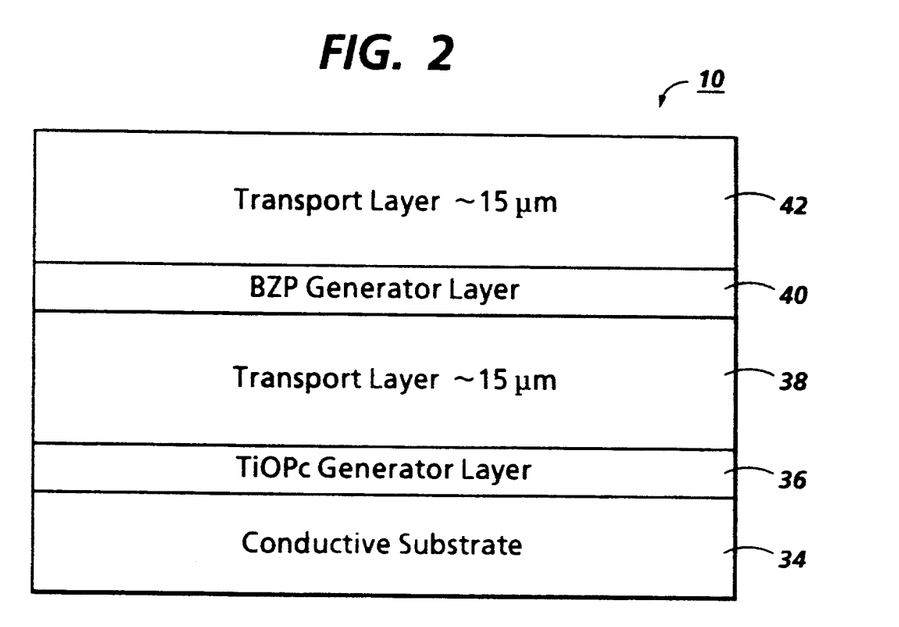
FIG. 2 is a schematic illustration of the cross-section side view of the dual layer photoreceptor belt for the double pass xerographic printing system of FIG. 1 formed according to the present invention.

As taught in copending patent application Ser. No. 07/987,886, commonly assigned with the present application and herein incorporated by reference, the photoreceptor belt 10 as shown in FIG. 2 consists of a flexible electrically conductive substrate 34. The substrate can be opaque, translucent, semitransparent, or transparent, and can be of any suitable conductive material, including copper, brass, nickel, zinc, chromium, stainless steel, conductive plastics and rubbers, aluminum, semitransparent aluminum, steel, cadmium, silver, gold, paper rendered conductive by the inclusion of a suitable material therein or through conditioning in a humid atmosphere to ensure the presence of sufficient water content to render the material conductive, indium, tin, metal oxides, including tin oxide and indium tin oxide, and the like. In addition, the substrate can comprise an insulative layer with a conductive coating, such as vacuum-deposited metallization on plastic, such as titanized or aluminized Mylar ® polyester, wherein the metallized surface is in contact with the bottom photoreceptor layer or any other layer such as a charge injection blocking or adhesive layer situated between the substrate and the bottom photoreceptor layer. The substrate has any effective thickness, typically from about 6 to about 250 microns, and preferably from about 50 to about 200 microns, although the thickness can be outside of this range. The photoreceptor layers themselves may consist of two or more sublayers. Each photoreceptor layer in FIG. 2 consists of two sublayers, i.e. a charge generation layer and a charge transport layer.

Upon the substrate is a titanyl phthalocyanine first or lower generator layer 36 of approximately 0.1 to 1 $\mu$m thickness, a first or lower transport layer 38 of N,N'-diphenyl-N,N'-bis(3"-methylphenyl)-(1,1'-biphenyl)-4,4'-diamine (TPD) in polycarbonate which is hole transporting and approximately 15 m thick, a benzimidazole perylene second or upper generator layer 40 of approximately 0.1 to 1 $\mu$m thickness, a second or upper transport layer 42 of TPD in polycarbonate which is hole transporting and approximately 15 m thick.

The titanyl phthalocyanine generator layer should be thin enough to maintain low dark decay and the benzimidazole generator layer should be thick enough to be opaque to the wavelength used to discharge it. Benzimidazole perylene is known to be coatable to opaque thicknesses while maintaining low dark decay.

For this illustrative example, the first generator layer is infrared sensitive and the second generator layer is red sensitive and the two wavelengths of the dual wavelength laser source are in the red (at 670 nm) and the infrared (at 830 nm). The general requirement is that each generator layer is sensitive to only one of the two different wavelengths of the laser source but not sensitive to the other wavelength or each generator layer can only be accessed by one of the two wavelengths.

In this illustrative embodiment, examples of suitable red light sensitive pigments include perylene pigments such as dibromoanthranthrone, crystalline trigonal selenium, beta-metal free phthalocyanine, azo pigments, and the like, as well as mixtures thereof. Examples of suitable infrared sensitive pigments include X-metal free phthalocyanine, metal phthalocyanines such as vanadyl phthalocyanine, chloroindium phthalocyanine, chloroaluminum phthalocyanine, copper phthalocyanine, magnesium phthalocyanine, and the like, squaraines, such as hydroxy squaraine, and the like as well as mixtures thereof. Examples of suitable charge transport materials include diamine molecules, pyrazoline molecules, substituted fluorene molecules, oxadiazole molecules, hydrazone molecules, carbazole phenyl hydrazone molecules, vinyl-aromatic polymers, oxadiazole derivatives, tri-substituted methanes, and 9-fluorenylidene methane derivatives.

The generator and transport layers can be deposited or vacuum evaporated or solvent coated upon the substrate by means known to those of ordinary skill in the art.

Figure 3:
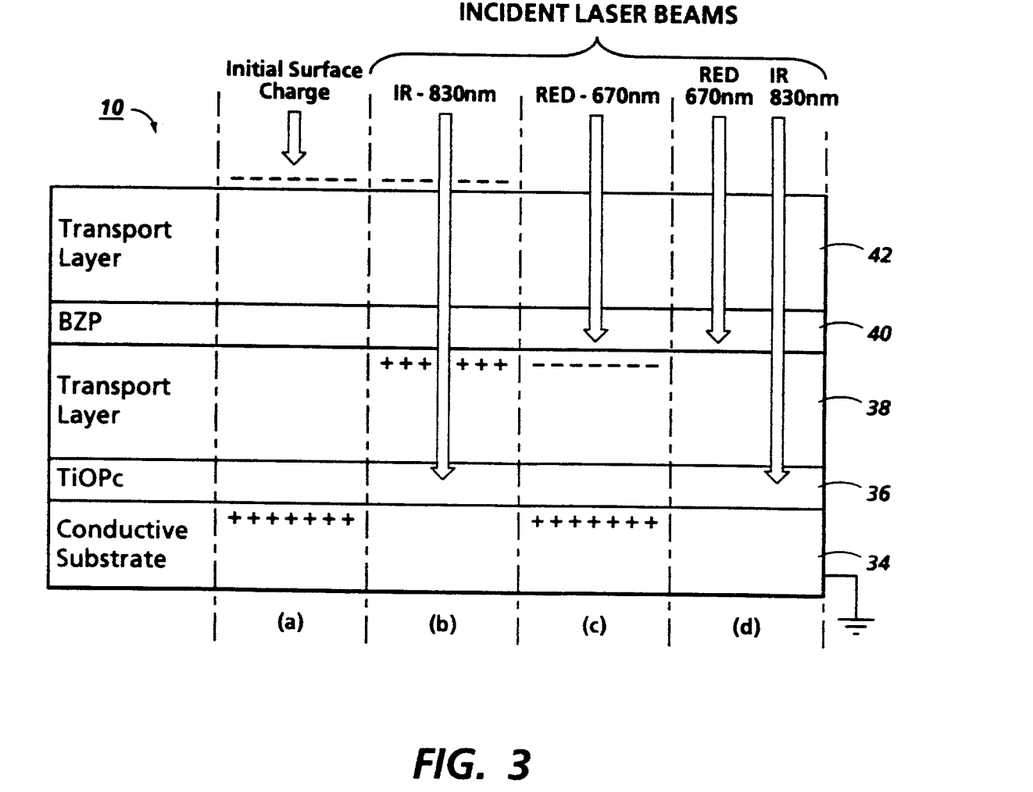
FIG. 3 is a schematic illustration of the cross-section side view of the exposure of the dual layer photoreceptor belt for the double pass xerographic printing system of FIG. 1 formed according to the present invention.

During exposure from the light beams from the raster output scanner within the photoreceptor belt as shown in FIG. 3, the 670 nm wavelength of one modulated beam would be entirely absorbed in the opaque benzimidazole perylene generator layer. Exposure with the 670 nm beam would therefore discharge the benzimidazole perylene and upper transport layer. None of the 670 nm light beam would reach the titanyl phthalocyanine layer so that the titanyl phthalocyanine and lower transport layer would remain fully charged. The second wavelength is chosen to be 830 nm to insure that it will pass completely through the benzimidazole perylene layer without effecting any discharge of the benzimidazole perylene or upper transport layer. However, the titanyl phthalocyanine layer is very sensitive to 830 nm and exposure with this wavelength from a modulated beam will discharge the titanyl phthalocyanine layer and the lower transport layer. However, the 830 nm exposure should not be allowed to effect discharge through the benzimidazole perylene layer and the upper transport layer.

Figure 4:
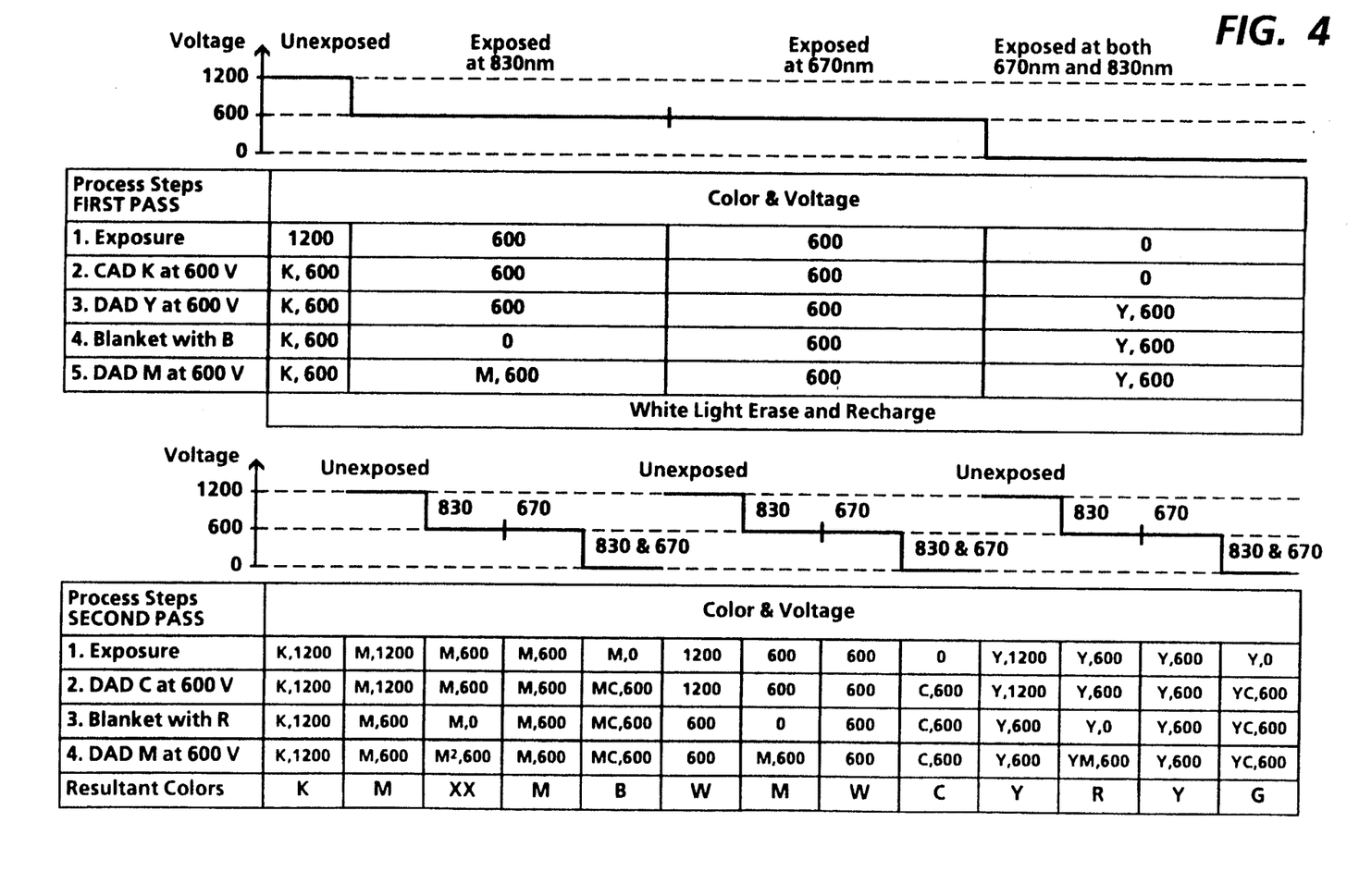
FIG. 4 is a schematic illustration of the development of the dual layer photoreceptor belt for the double pass xerographic printing system of FIG. 1 formed according to the present invention.

The details of the imaging process to expose the image in a pass of the photoreceptor belt are shown in FIG. 3. There are four resultant areas on the photoreceptor after the first pass by the imaging station: (a) the unexposed areas which retain the original surface voltage, (b) the areas exposed with 830 nm which are discharged to roughly one-half of the original surface voltage, (c) the areas exposed with 670 nm which are also discharged to roughly one-half of the original surface voltage, and (d) the areas exposed with both 830 and 670 nm which are fully discharged. While only three voltage levels are present on the photoreceptor at this stage immediately after exposure, there will be four distinctly different areas on the photoreceptor after xerographic development as shown in FIG. 4. While the surface voltages in regions (b) and (c) are roughly equal after exposure they have been formed in very distinct ways. During the development process the photoreceptor will remember how these voltages were formed to allow development in very different ways in the two regions.

The steps in the full color development process of the double pass xerographic printing system of FIG. 1, shown in FIG. 4 are: in the first pass; after charging of the photoreceptor belt; first, exposure of the photoreceptor belt to the two modulated laser beams of different wavelengths; second, CAD development with black toner at 600 volts; third, DAD development with yellow toner at 600 volts; fourth, blanket exposure of the photoreceptor belt with blue light; and fifth, DAD development with magenta toner at 600 volts. Then, blanket exposure of the photoreceptor belt with white light as an erasure and recharging of the photoreceptor belt, and, in the second pass; first, exposure of the photoreceptor belt to the two modulated laser beams of different wavelengths; second, DAD development with cyan toner at 600 volts; third, blanket exposure of the photoreceptor belt with red light; and fourth, DAD development with magenta toner at 600 volts. As shown in FIG. 4, the double pass xerographic printing system of FIG. 1 will be a full color process printing all six primary colors of cyan, yellow, magenta, blue, green and red, in addition to black and white.

On the first pass of the photoreceptor belt 10, after charging at station A and exposure at the ROS at station B; at first development station C, a development system, indicated generally by the reference numeral 44, advances developer materials into contact with the CAD electrostatic latent images. The development system 44 comprises a developer housing (not shown) which contains magnetic brush rollers (also not shown). The rollers advance developer material into contact with the photoreceptor 10 for developing the charged-area regions ($V_{CAD}$). The developer material, by way of example, contains black toner which will be positively charged for a negatively charged photoreceptor. The black toner is applied to the latent electrostatic images contained on the photoconductive surface 10 via magnetic brush rollers, the carrier of this two component developer being selected such that the black toner is positively charged through triboelectric charging thereagainst. Electrical biasing is accomplished via power supply, electrically connected to the developer apparatus. A suitable DC bias volts is applied to the rollers and the developer housing via the power supply.

At second development station D, a development system, indicated generally by the reference numeral 46, advances developer materials into contact with the DAD electrostatic latent images. The development system 46 comprises a developer housing (not shown) which contains magnetic brush rollers (also not shown). The rollers advance developer material into contact with the photoreceptor for developing the discharged-area regions ($V_{DAD}$). The developer material, by way of example, contains yellow toner which will be negatively charged for a negatively charged photoreceptor. Appropriate electrical biasing is accomplished via power supply electrically connected to the developer apparatus. A suitable DC bias is applied to the rollers and to the developer housing via the bias power supply.

The details of the xerographic process to develop the image in a pass are shown in FIG. 3. For convenience, the 3 voltage levels after exposure are assumed to be 1200 V, 600 V and 0 V. CAD development at the first development housing at a bias of 600 V is used to deposit black (K) toner in the unexposed (a) regions. DAD development at the second development housing at a bias of 600 V is used to deposit yellow (Y) toner in the fully exposed (d) regions.

The condition of the photoconductor after these first two steps of development is that the developed portions of the photoreceptor with deposited color toners will now have voltage levels approximately equal to the respective developer housing bias levels as the result of using a development system such as Conductive Magnetic Brush (CMB) development since the primary development mechanism is charge neutralization.

Next, a non-imagewise uniform blanket exposure of blue light is applied to the photoreceptor at first uniform exposure station E with a well controlled light source such as a fluorescent lamp 48, as shown in FIG. 1. The areas of the photoreceptor that have already been developed with black and yellow toners, are shielded from the light by the deposited toner, so, little or no discharge occurs in these areas. The emission spectrum of the lamp, if necessary, could be tuned relative to the absorption spectra of the toners to fully insure that discharge beneath the toner does not take place.

As seen in FIG. 4, blanket exposure with blue light will leave the unexposed region (a) unaffected since the black toner should prevent exposure of the underlying photoreceptor. The white or 670 nm exposed (c) regions should also be unaffected since the benzimidazole perylene layer will absorb all of the blue light before it gets to the titanyl phthalocyanine layer. However, absorption in the benzimidazole perylene will not affect the surface voltage since the top half of the photoreceptor has already been discharged by exposure to 670 nm in the white (c) regions. Since the 830 nm exposed (b) regions have not yet seen blue light, the top half of the photoreceptor will be discharged by this blanket blue exposure to put these regions in a fully discharged state. This is how the photoreceptor remembers its previous history and a blanket exposure with blue light separates the voltages in the 670 nm exposed (c) and the 830 nm exposed (b) regions. Since the fully exposed (d) regions are shielded by yellow toner, the blanket exposure with blue light has no effect there.

Returning to FIG. 1, during the first pass of the photoreceptor belt, the third development station F, a development station indicated generally by the reference numeral 50, is moved away from the photoreceptor belt 10 (the off state). Also, during the first pass of the photoreceptor belt, the second uniform exposure station G having a well controlled light source such as a fluorescent lamp 52, is moved away from the photoreceptor belt 10 (the off state).

At fourth development station H, a development system, indicated generally by the reference numeral 54, advances developer materials into contact with the DAD electrostatic latent images. The development system 54 comprises a developer housing (not shown). As shown in FIG. 4, DAD development at the fourth developer station at 600 V is used to deposit magenta (M) toner on the 830 nm exposed (b) regions of FIG. 3. The developer housing contains magnetic brush rollers (also not shown). The rollers advance developer material into contact with the photoreceptor for developing the discharged-area regions ($V_{DAD}$). The developer material contains magenta toner which will be negatively charged for a negatively charged photoreceptor. Appropriate electrical biasing is accomplished via a power supply electrically connected to the developer apparatus. A suitable DC bias is applied to the rollers and to the developer housing via the bias power supply.

The general requirement for the first blanket exposure station E and the DAD fourth development station H is that the wavelength of the blanket exposure light should not penetrate the already toned regions and should discharge only one of the two already partially discharged regions, and the color toner deposited by the fourth development station should be different from the color toners used in the first two developer stations C and D.

During the first pass of the photoreceptor belt, the pre-transfer charging station I, the transfer station J, and the fusing station K are moved away from the photoreceptor belt 10 (the off state). Also, during the first pass of the photoreceptor belt, the cleaning station L containing a cleaner apparatus 58 is moved away from the photoreceptor belt 10 (the off state).

Next, a non-imagewise uniform blanket exposure of white light is applied to the photoreceptor at erasure exposure station M with a well controlled light source such as a fluorescent or incandescent lamp 56. The erasure exposure station M generally gives out a broad band of white light as opposed to the uniform exposure stations which usually give out only one color (a narrower band) of light.

The white light erases all of the electric fields within the photoreceptor under the magenta, yellow and white areas so these areas can be recharged to approximately 1200 V so that a uniform field is again applied across the dual layer photoreceptor in preparation for subsequent imaging, development and uniform exposure steps. Electric fields within the photoreceptor under the black toned areas are not as critical since, after recharge to approximately 1200 V, these areas are not re-exposed or redeveloped on the second pass.

The photoreceptor belt 10 then begins its second pass through the double pass xerographic printing system 5 of FIG. 1.

Initially successive portions of belt 10 pass through charging station A during the second pass, where a corona discharge device such as a scorotron, corotron, or dicorotron, indicated generally by the reference numeral 14, recharges the belt 10 to a selectively high uniform positive or negative potential, $V_0$.

Next, the charged portions of the photoreceptor surface are advanced through exposure station B. At exposure station B, the uniformly charged photoreceptor or charge retentive surface 10 is exposed to a raster output scanning device 16 which causes the charge retentive surface to remain charged or to be discharged in accordance with the output from the scanning device in the untoned areas as well as in the magenta and yellow toned areas as seen in step 2 of the second pass in FIG. 4. An electronic subsystem converts a previously stored image into the appropriate control signals for the ROS in an imagewise fashion. The semiconductor laser beams are modulated by modulating the drive current to each of the lasers.

During the second pass of the photoreceptor belt, at the first development station C, the development station 44 is moved away from the photoreceptor belt 10 (the off state). At the second development station D, the development station 46 is moved away from the photoreceptor belt 10 (the off state). Also, during the second pass of the photoreceptor belt, at the first uniform exposure station E, the fluorescent lamp 48 is moved away from the photoreceptor belt 10 (the off state).

At third development station F, a development system, indicated generally by the reference numeral 50, advances developer materials into contact with the DAD electrostatic latent images. The development system 50 comprises a developer housing (not shown) which contains magnetic brush rollers (also not shown). The rollers advance developer material into contact with the photoreceptor for developing the discharged-area regions ($V_{DAD}$). The developer material, by way of example, contains cyan toner which will be negatively charged for a negatively charged photoreceptor. Appropriate electrical biasing is accomplished via a power supply electrically connected to the developer apparatus. A suitable DC bias is applied to the rollers and to the developer housing via the bias power supply. As seen in step 2 of the second pass in FIG. 4, cyan toner is deposited in the three regions of the photoreceptor which are at approximately 0 V, i.e. in an untoned area and in areas previously covered with magenta and yellow toners.

Next, a non-imagewise uniform blanket exposure of red light is applied to the photoreceptor at second uniform exposure station G with a well controlled light source such as a fluorescent lamp 52. The areas of the photoreceptor that have already been developed with cyan or black toners, are shielded from the light by the deposited toner, so, little or no discharge occurs in these areas. However, the red light will penetrate the magenta and yellow toners and will effect discharge beneath these toners in areas that have not yet been exposed to red light during the second imagewise exposure. The emission spectrum of the lamp, if necessary, could be tuned relative to the absorption spectra of the toners to fully insure blocking by the cyan and black toners and transmission by the magenta and yellow toners.

As seen in FIG. 4, step 3, aside from the areas covered by black toner which are unaffected, blanket exposure with red light will discharge the unexposed regions under the magenta, yellow and untoned areas by approximately 600 V. The 670 nm exposed regions should be unaffected since the benzimidazole perylene layer will absorb all of the red light before it gets to the titanyl phthalocyanine layer. However, absorption in the benzimidazole perylene will not affect the surface voltage since the top half of the photoreceptor has already been discharged by exposure to 670 nm. Since the 830 nm exposed regions have not yet seen red light, the top half of the photoreceptor will be discharged by this blanket red exposure to put these regions in a fully discharged state as shown in step 3 of the second pass of FIG. 4. This is how the photoreceptor remembers its previous history and a blanket exposure with red light separates the voltages in the 670 nm exposed and the 830 nm exposed regions. Since the fully exposed regions are shielded by cyan toner from step 2, the blanket exposure with red light has no effect there.

At fourth development station H, a development system, indicated generally by the reference numeral 54, advances developer materials into contact with the DAD electrostatic latent images. The development system 54 comprises a developer housing (not shown). DAD development at the fourth developer station at 600 V is used to deposit magenta (M) toner on the 830 nm exposed regions of the second pass of FIG. 4. The developer housing contains magnetic brush rollers (also not shown). The rollers advance developer material into contact with the photoreceptor for developing the discharged-area regions ($V_{DAD}$). The developer material contains magenta toner which will be negatively charged for a negatively charged photoreceptor. Appropriate electrical biasing is accomplished via a power supply electrically connected to the developer apparatus. A suitable DC bias is applied to the rollers and to the developer housing via the bias power supply.

The general requirement for the second blanket exposure station G and the DAD fourth development station H is that the wavelength of the blanket exposure light should not penetrate the regions toned with black and cyan toner but should penetrate the regions toned with magenta and yellow toner and should discharge only one of the two already partially discharged areas in the three general regions of the photoreceptor which have been imagewise exposed a second time. The color toner deposited by the fourth development station should be different from the color toner used in the third developer station F.

Thus, as shown in FIG. 4, the cyan deposited in the second pass can be combined with the yellow from the first pass to form green. The cyan deposited in the second pass can be combined with the magenta from the first pass to form blue. The magenta deposited in the second pass can be combined with the yellow from the first pass to form red. Thus, the development process of the double pass xerographic printing system of FIG. 1 will produce all six primary colors of cyan, yellow, magenta, blue, green and red, in addition to black and white.

Because the composite image developed on the photoreceptor consists of both positive and negative toner, a typically positive pre-transfer corona charging member 60, disposed at pre-transfer charging station I, is provided to condition the toner for effective transfer to a substrate using positive corona charge. The pre-transfer corona charging member is preferably an AC corona device biased with a DC voltage to operate in a field sensitive mode and to perform tri-level xerography pre-transfer charging in a way that selectively adds more charge (or at least comparable charge) to the parts of the image that must have their polarity reversed. This charge discrimination may be enhanced by discharging the photoreceptor carrying the composite developed latent image with light before the pre-transfer charging begins. Furthermore, flooding the photoreceptor with light coincident with the pre-transfer charging minimizes the tendency to overcharge portions of the image which are already at the correct polarity.

A sheet of support material 62 is moved into contact with the toner image at transfer station J. The sheet of support material is advanced to transfer station J by a conventional sheet feeding apparatus, not shown. Preferably, the sheet feeding apparatus includes a feed roll contacting the uppermost sheet of a stack copy sheets. Feed rolls rotate to advance the uppermost sheet from stack into a chute which directs the advancing sheet of support material into contact with photoconductive surface of belt 10 in a timed sequence, so that the developed toner powder image contacts the advancing sheet of support material at transfer station J.

Transfer station J includes a corona generating device 64 which sprays ions of a suitable polarity onto the backside of sheet 62. This attracts the charged toner powder images from the belt 10 to sheet 62. After transfer, the sheet continues to move, in the direction of arrow 66, onto a conveyor (not shown) which advances the sheet to fusing station K.

Fusing station K includes a fuser assembly, indicated generally by the reference numeral 68, which permanently affixes the transferred powder image to sheet 62. Preferably, fuser assembly 68 comprises a heated fuser roller 70 and a backup roller 72. Sheet 62 passes between fuser roller 70 and backup roller 72 with the toner powder image contacting fuser roller 70. In this manner, the toner powder image is permanently affixed to sheet 62. After fusing, a chute, not shown, guides the advancing sheet 62 to a catch tray, also not shown, for subsequent removal from the printing machine by the operator.

After the sheet of support material is separated from photoconductive surface of belt 10, the residual toner particles carried on the photoconductive surface are removed therefrom. These particles are removed at cleaning station L. A magnetic brush cleaner housing is disposed at the cleaner station L. The cleaner apparatus 58 comprises a conventional magnetic brush roll structure for causing carrier particles in the cleaner housing to form a brush-like orientation relative to the roll structure and the charge retentive surface. It also includes a pair of detoning rolls for removing the residual toner from the brush.

Subsequent to cleaning, a discharge lamp 56 of the erasure exposure station M floods the photoconductive surface with light to dissipate any residual electrostatic charge remaining prior to the charging thereof for the successive imaging cycle.

Figure 5:
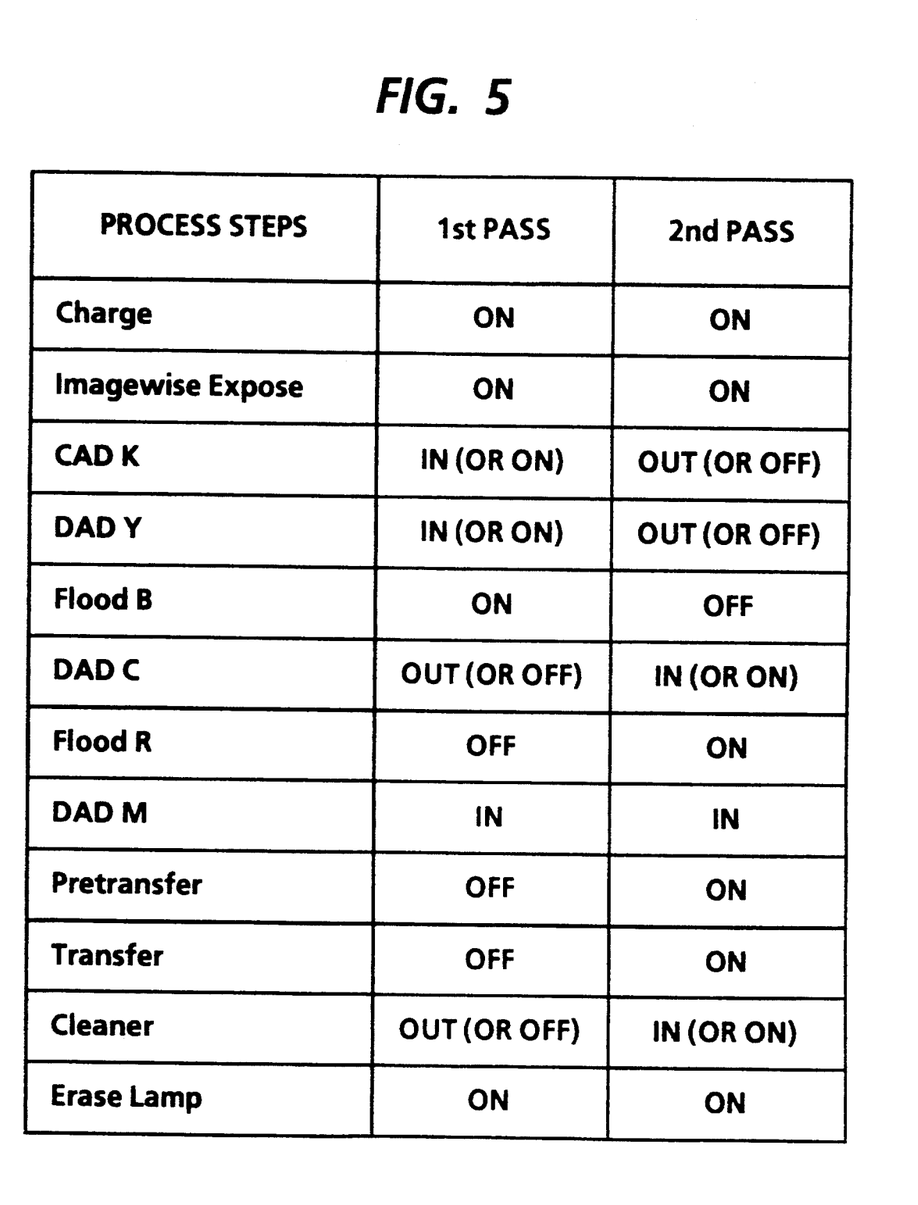
FIG. 5 is a schematic illustration of the various elements of the double pass xerographic printing system of FIG. 1 and their status during the first and second passes of the dual layer photoreceptor belt formed according to the present invention.

The status of the developer stations and the other process stations of the xerographic printing system of FIG. 1 are shown in FIG. 5 for both the first and second pass. The charging, imagewise exposure and erasure station are all on for both cycles. The CAD black, DAD yellow, blue flood and DAD magenta are all on for the first pass and off (moved away) for the second pass with the exception of DAD magenta which is on for both passes.

Therefore, in the first pass, black, yellow and magenta toners are deposited. The pre-transfer, transfer and cleaner are all off (moved away) on the first pass so that the existing partial image moves around undisturbed for the second pass. After the flood erase, recharging and imaging exposure of the second pass, the DAD cyan, red flood exposure and DAD magenta are all on for the second pass so that cyan gets deposited on magenta and yellow, and magenta gets deposited on yellow to complete the full color gamut. None of the black, yellow or magenta toner from the first pass are on top of each other, but only beside each other. The required color on color combinations, are produced in the second pass. The pre-transfer, transfer and cleaning devices are all on during the second pass to transfer the toner image and clean the residual toner from the photoreceptor.

As seen in FIG. 4, the basic components (C, M, Y, R, B, G, K and W) for realizing the full gamut of colors are all achieved, some in a multiplicity of ways. This permits choices in the formation routes which would be chosen to optimize image quality.

The dual layer photoreceptor belt can also be used with a single pass xerographic printing system to produce a full color process of all six primary colors of cyan, yellow, magenta, blue, green and red, in addition to black and white.

Figure 6:
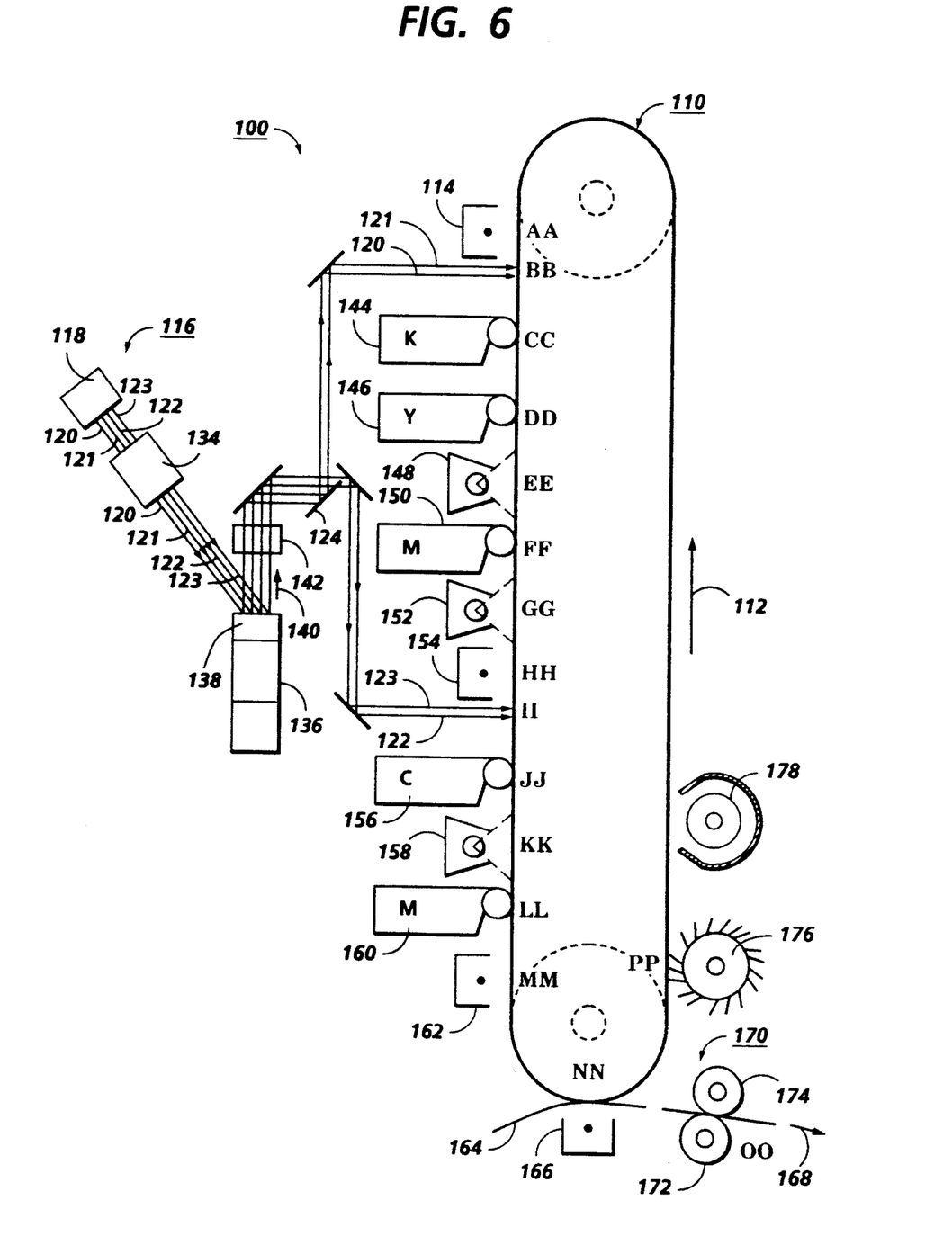
FIG. 6 is a schematic illustration of the cross-section side view of the single pass xerographic printing system.

Reference is now made to FIG. 6, wherein there is illustrated a single pass xerographic printing system 100 incorporating the invention which may utilize a charge retentive member in the form of a photoconductive belt 110 consisting of a photoconductive surface and an electrically conductive substrate and mounted for movement past a first charging station AA, a first exposure station BB, a first development station CC, a second development station DD, a first uniform exposure station EE, a third development station FF, an erasure exposure station GG, a second charging station HH, a second exposure station II, a fourth development station JJ, a second uniform exposure station KK, a fifth development station LL, a pre-transfer charging station MM, a transfer station NN, a fusing station OO, and a cleaning station PP.

The belt 110 moves in the direction of arrow 112 to advance successive portions of the belt sequentially through the various processing stations disposed about the path of movement thereof for forming images in a single pass of the belt through all of the process stations. The belt 110 is entrained about a plurality of rollers (not shown), one of which can be used as a drive roller and the others of which can be used to provide suitable tensioning of the photoreceptor belt 110. A motor (also not shown) rotates the drive roller to advance the belt 110 in the direction of arrow 112. The drive roller can be coupled to the motor by suitable means such as a belt drive.

As can be seen by further reference to FIG. 6, initially successive portions of belt 110 pass through charging station AA, where a corona discharge device such as a scorotron, corotron, or dicorotron, indicated generally by the reference numeral 114, charges the belt 110 to a selectively high uniform positive or negative potential, $V_0$. Any suitable control circuit, as well known in the art, may be employed for controlling the corona discharge device 14.

Next, the charged portions of the photoreceptor surface are advanced through the first exposure station BB. At the first exposure station BB, the uniformly charged photoreceptor or charge retentive surface 110 is exposed to a raster output scanning device 116 which causes the charge retentive surface to remain charged or to be discharged in accordance with the output from the scanning device. An electronic subsystem converts a previously stored image into the appropriate control signals for the ROS in an imagewise fashion.

The raster output scanner 116 can use a dual wavelength hybrid laser semiconductor structure 118 consisting of a 670 nm wavelength laser emitter such as a semiconductor structure of AlGaInP/GaAs which emits two beams, one of TE polarization and one of TM polarization, and a 830 nm laser emitter such as a semiconductor structure of AlGaAs/GaAs which emits two beams, one of TE polarization and one of TM polarization, both laser emitter structures being known to those of ordinary skill in the art. The four beams of two wavelengths and two polarizations could also be produced from a monolithic semiconductor laser structure.

In the raster output scanner 116, the four bundled laser beams 120, 121, 122 and 123 from the laser structure 118 are split into two pairs of separated beams based on polarization by polarization beam splitter 124. Thus, beam 120 (at 670 nm and TE polarized) and beam 121 (at 830 nm and TE polarized) are sent to first exposure and imaging station BB to effect the first exposure. Beam 122 (at 670 nm and TM polarized) and beam 123 (at 830 nm and TM polarized) are sent to second exposure and imaging station II to effect the second exposure.

These four beams 120, 121, 122 and 123 are input to a conventional input optical system 134 which collimates, conditions and focuses the beams onto an optical path such that they illuminate a rotating polygon mirror 136 having a plurality of facets 138. As the polygon mirror rotates, the facets cause the reflected beam to deflect repeatedly in the direction indicated by the arrow 140. The four deflected laser beams are input to a single set of imaging and correction optics 142, which corrects for errors such as polygon angle error and wobble and focuses the beams onto the photoreceptor belt at first exposure station BB and second exposure station II. The output beams of the semiconductor lasers are modulated by modulating the drive current to each of the lasers.

At first exposure station BB, the uniformly charged photoreceptor or charge retentive surface 110 is exposed to the TE polarized modulated beams 120 and 121 of the raster output scanning device 116 which causes the charge retentive surface to remain charged or to be discharged in accordance with the output from the scanning device.

The photoreceptor belt 110 of the single pass xerographic printing system 100 of FIG. 6 is the same as the photoreceptor belt 10 of the double pass xerographic printing system 5 of FIGS. 1 and 2. The photoreceptor belt 110 consists of a flexible electrically conductive substrate. Upon the substrate is a titanyl phthalocyanine first or lower generator layer of approximately 0.1 to 1 ⎜m thickness, a first or lower transport layer of N,N′-diphenyl-N,N′-bis(3″-methylphenyl)-(1,1′-biphenyl)-4,4′-diamine (TPD) in polycarbonate which is hole transporting and approximately 15⎜m thick, a benzimidazole perylene second or upper generator layer of approximately 0.1 to 1⎜m thickness, a second or upper transport layer of TPD in polycarbonate which is hole transporting and approximately 15⎜m thick. For this illustrative example, the first generator layer is infrared sensitive and the second generator layer is red sensitive and the two wavelengths of the dual wavelength laser source are in the red (at 670 nm) and the infrared (at 830 nm). The general requirement is that each generator layer is sensitive to only one of the two different wavelengths of the laser source but not sensitive to the other wavelength or each generator layer can only be accessed by one of the two wavelengths.

Figure 7:
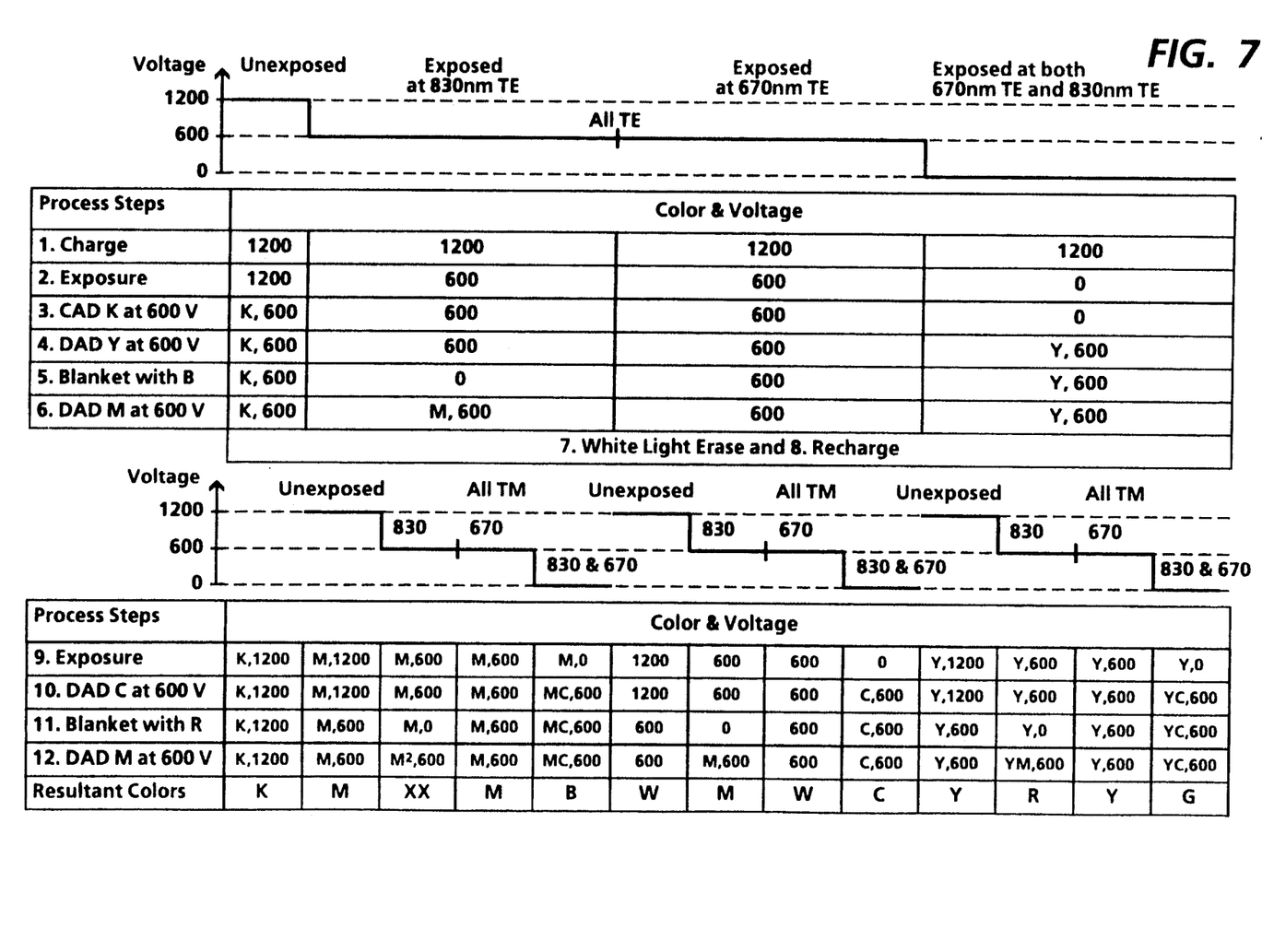
FIG. 7 is a schematic illustration of the development of the dual layer photoreceptor belt for the single pass xerographic printing system of FIG. 6 formed according to the present invention.

The steps in the full color development process of the single pass xerographic printing system of FIG. 6, shown in FIG. 7, are: first, charging of the photoreceptor belt: second, exposure of the photoreceptor belt to the two modulated laser beams of different wavelengths but the same polarization; third, CAD development with black toner at 600 volts; fourth, DAD development with yellow toner at 600 volts; fifth, blanket exposure of the photoreceptor belt with blue light; sixth, DAD development with magenta toner at 600 volts; seventh, blanket exposure of the photoreceptor belt with white light as an erasure; eighth, recharging of the photoreceptor belt; ninth, exposure of the photoreceptor belt to the two modulated laser beams of different wavelengths but the same polarization; tenth, DAD development with cyan toner at 600 volts; eleventh, blanket exposure of the photoreceptor belt with red light; and twelfth, DAD development with magenta toner at 600 volts. As shown in FIG. 7, the single pass xerographic printing system of FIG. 6 will be a full color process printing all six primary colors of cyan, yellow, magenta, blue, green and red, in addition to black and white.

After charging at the first charging station AA and exposure at the ROS at the first exposure station BB; at first development station CC, a development system, indicated generally by the reference numeral 144, advances developer materials into contact with the CAD electrostatic latent images. The development system 144 comprises a developer housing (not shown) which contains magnetic brush rollers (also not shown). The rollers advance developer material into contact with the photoreceptor 110 for developing the charged-area regions ($V_{CAD}$). The developer material, by way of example, contains black toner which will be positively charged for a negatively charged photoreceptor. The black toner is applied to the latent electrostatic images contained on the photoconductive surface 110 via magnetic brush rollers, the carrier of this two component developer being selected such that the black toner is positively charged through triboelectric charging thereagainst. Electrical biasing is accomplished via a power supply, electrically connected to the developer apparatus. A suitable DC bias volts is applied to the rollers and the developer housing via the power supply.

At second development station DD, a development system, indicated generally by the reference numeral 146, advances developer materials into contact with the DAD electrostatic latent images. The development system 146 comprises a developer housing (not shown) which contains magnetic brush rollers (also not shown). The rollers advance developer material into contact with the photoreceptor for developing the discharged-area regions ($V_{DAD}$). The developer material, by way of example, contains yellow toner which will be negatively charged for a negatively charged photoreceptor. Appropriate electrical biasing is accomplished via a power supply electrically connected to the developer apparatus. A suitable DC bias is applied to the rollers and to the developer housing via the bias power supply.

Next, a non-imagewise uniform blanket exposure of blue light is applied to the photoreceptor at first uniform exposure station EE with a well controlled light source such as a fluorescent lamp 148, as shown in FIG. 1. The areas of the photoreceptor that have already been developed with black and yellow toners, are shielded from the light by the deposited toner, so, little or no discharge occurs in these areas. The emission spectrum of the lamp, if necessary, could be tuned relative to the absorption spectra of the toners to fully insure that discharge beneath the toner does not take place.

At third development station FF, a development system, indicated generally by the reference numeral 150, advances developer materials into contact with the DAD electrostatic latent images. The development system 150 comprises a developer housing (not shown). DAD development at the fourth developer station at 600 V is used to deposit magenta (M) toner on the 830 nm exposed (b) regions of FIG. 3 and 7. The developer housing contains magnetic brush rollers (also not shown). The rollers advance developer material into contact with the photoreceptor for developing the discharged-area regions ($V_{DAD}$). The developer material contains magenta toner which will be negatively charged for a negatively charged photoreceptor. Appropriate electrical biasing is accomplished via a power supply electrically connected to the developer apparatus. A suitable DC bias is applied to the rollers and to the developer housing via the bias power supply.

The only general requirement for the first blanket exposure station EE and the DAD third development station FF is that the wavelength of the blanket exposure light should not penetrate the already toned regions and should discharge only one of the two already partially discharged regions and the color toner deposited by the fourth development station should be different from the color toners used in the first two developer stations CC and DD.

Next, a non-imagewise uniform blanket exposure of white light is applied to the photoreceptor at erasure exposure station GG with a well controlled light source such as a fluorescent or incandescent lamp 152. The erasure exposure station GG generally gives out a broad band of white light as opposed to the uniform exposure stations which usually give out only one color (a narrower band) of light.

The white light erases all of the electric fields within the photoreceptor under the magenta, yellow and white areas so these areas can be recharged to approximately 1200 V so that a uniform field is again applied across the dual layer photoreceptor in preparation for subsequent imaging, development and uniform exposure steps. Electric fields within the photoreceptor under the black toned areas are not as critical since, after recharge to approximately 1200 V, these areas are not re-exposed or redeveloped on the second pass.

The belt 110 then passes through the second charging station HH, where a corona discharge device such as a scorotron, corotron, or dicorotron, indicated generally by the reference numeral 154, charges the belt 110 to a selectively high uniform positive or negative potential, $V_0$.

Next, the charged portions of the photoreceptor surface are advanced through the second exposure station II. At exposure station II, the uniformly charged photoreceptor or charge retentive surface 110 is exposed to the TM polarized modulated beams 122 and 123 of the raster output scanning device 116 which causes the charge retentive surface to remain charged or to be discharged in accordance with the output from the scanning device. An electronic subsystem converts a previously stored image into the appropriate control signals for the ROS in an imagewise fashion. The semiconductor laser beams are modulated by modulating the drive current to each of the lasers.

At fourth development station JJ, a development system, indicated generally by the reference numeral 156, advances developer materials into contact with the DAD electrostatic latent images. The development system 156 comprises a developer housing (not shown) which contains magnetic brush rollers (also not shown). The rollers advance developer material into contact with the photoreceptor for developing the discharged-area regions ($V_{DAD}$). The developer material, by way of example, contains cyan toner which will be negatively charged for a negatively charged photoreceptor. Appropriate electrical biasing is accomplished via a power supply electrically connected to the developer apparatus. A suitable DC bias is applied to the rollers and to the developer housing via the bias power supply.

Next, a non-imagewise uniform blanket exposure of red light is applied to the photoreceptor at second uniform exposure station KK with a well controlled light source such as a fluorescent lamp 158. The areas of the photoreceptor that have already been developed with cyan or black toners, are shielded from the light by the deposited toner, so, little or no discharge occurs in these areas. However, the red light will penetrate the magenta and yellow toners and will effect discharge beneath those toners in areas that have not yet been exposed to red light during the second imagewise exposure. The emission spectrum of the lamp, if necessary, could be tuned relative to the absorption spectra of the toners to fully insure blocking by the cyan and black toners and transmission by the magenta and yellow toners.

At fifth development station LL, a development system, indicated generally by the reference numeral 160, advances developer materials into contact with the DAD electrostatic latent images. The development system 160 comprises a developer housing (not shown). DAD development at the fourth developer station at 600 V is used to deposit magenta (M) toner on the three 830 nm exposed regions from imaging station II. The developer housing contains magnetic brush rollers (also not shown). The rollers advance developer material into contact with the photoreceptor for developing the discharged-area regions ($V_{DAD}$). The developer material contains magenta toner which will be negatively charged for a negatively charged photoreceptor. Appropriate electrical biasing is accomplished via a power supply electrically connected to the developer apparatus. A suitable DC bias is applied to the rollers and to the developer housing via the bias power supply.

The general requirement for the second blanket exposure station KK and the DAD fifth development station LL is that the wavelength of the blanket exposure light should not penetrate the regions toned with black and cyan toner but should penetrate the regions toned with magenta and yellow toner and should discharge only one of the two already partially discharged areas in the three general regions of the photoreceptor which have been imagewise exposed a second time. The color toner deposited by the fifth development station should be different from the color toner used in the fourth developer station JJ.

Thus, as shown in FIG. 7, the cyan deposited after the second exposure can be combined with the yellow resulting from the first exposure to form green. The cyan deposited after the second exposure can be combined with the magenta resulting from the first exposure to form blue. The magenta deposited after the second exposure can be combined with the yellow resulting from the first exposure to form red. Thus, the development process of the single pass xerographic printing system of FIG. 6 will produce all six primary colors of cyan, yellow, magenta, blue, green and red, in addition to black and white.

Because the composite image developed on the photoreceptor consists of both positive and negative toner, a typically positive pre-transfer corona charging member 162, disposed at pre-transfer charging station MM, is provided to condition the toner for effective transfer to a substrate using positive corona charge. The pre-transfer corona charging member is preferably an AC corona device biased with a DC voltage to operate in a field sensitive mode and to perform tri-level xerography pre-transfer charging in a way that selectively adds more charge (or at least comparable charge) to the parts of the image that must have their polarity reversed. This charge discrimination may be enhanced by discharging the photoreceptor carrying the composite developed latent image with light before the pre-transfer charging begins. Furthermore, flooding the photoreceptor with light coincident with the pre-transfer charging minimizes the tendency to overcharge portions of the image which are already at the correct polarity.

A sheet of support material 164 is moved into contact with the toner image at transfer station NN. The sheet of support material is advanced to transfer station NN by a conventional sheet feeding apparatus, not shown. Preferably, the sheet feeding apparatus includes a feed roll contacting the uppermost sheet of a stack copy sheets. Feed rolls rotate to advance the uppermost sheet from stack into a chute which directs the advancing sheet of support material into contact with photoconductive surface of belt 110 in a timed sequence, so that the developed toner powder image contacts the advancing sheet of support material at transfer station NN.

Transfer station NN includes a corona generating device 166 which sprays ions of a suitable polarity onto the backside of sheet 164. This attracts the charged toner powder images from the belt 110 to sheet 164. After transfer, the sheet continues to move, in the direction of arrow 168, onto a conveyor (not shown) which advances the sheet to fusing station OO.

Fusing station OO includes a fuser assembly, indicated generally by the reference numeral 170, which permanently affixes the transferred powder image to sheet 164. Preferably, fuser assembly 170 comprises a heated fuser roller 172 and a backup roller 174. Sheet 164 passes between fuser roller 172 and backup roller 174 with the toner powder image contacting fuser roller 172. In this manner, the toner powder image is permanently affixed to sheet 164. After fusing, a chute, not shown, guides the advancing sheet 164 to a catch tray, also not shown, for subsequent removal from the printing machine by the operator.

After the sheet of support material is separated from photoconductive surface of belt 110, the residual toner particles carried on the photoconductive surface are removed therefrom. These particles are removed at cleaning station PP. A magnetic brush cleaner housing is disposed at the cleaner station PP. The cleaner apparatus 176 comprises a conventional magnetic brush roll structure for causing carrier particles in the cleaner housing to form a brush-like orientation relative to the roll structure and the charge retentive surface. It also includes a pair of detoning rolls for removing the residual toner from the brush.

Subsequent to cleaning, a discharge lamp 178 floods the photoconductive surface with light to dissipate any residual electrostatic charge remaining prior to the charging thereof for the successive imaging cycle.

The use of a quad beam light source with the four emitted beams sharing the same optical elements in the raster output scanner optical system provides improved pixel placement accuracy upon the photoreceptor belt since common polygon optics are used. Sharing the optical elements also reduces the physical size, the number of optical elements and the costs of the ROS. However, the sharing of optical elements by the quad beams is merely an illustrative example of the xerographic printing system. Each beam could have a separate ROS optical system or just share certain ROS optical elements, like the facet of the rotating polygon mirror.

Rather than a polarizing splitter, the four beams can be split into two pairs of laser beams at different wavelengths by other means. For example, the beams could be split on the basis of their wavelengths. To illustrate this possibility, consider the four emitted beams to be two red beams at 630 and 680 nm and two infrared beams at 830 and 880 nm. The polarization splitter element 124 in FIG. 6 could be replaced with a wavelength splitter element which would pass the 630 nm and 830 nm beams and reflect the 680 nm and 880 nm beams. In this case, the 630 nm and 830 nm beams would be used at the second imaging station II and the 680 nm and 880 nm beams would be used at the first exposure and imaging station BB. Alternately, the wavelength splitter could be designed to pass the 630 nm and 880 nm beams and reflect the 680 nm and 830 nm beams. In this case, the 630 nm and 880 nm beams would be used at the second imaging station II while the 680 nm and 830 nm beams would be used at the first exposure and imaging station BB. Other combinations of wavelengths with specially designed wavelength splitting elements are, of course, possible.

The specific wavelengths and voltages used in the present application are merely illustrative examples. The actual wavelengths or actual voltages may be different or may be within a range of wavelengths or voltages.

The photoreceptor belt of the present invention can, in the alternative, be a drum photoreceptor or other equivalents.

As will be appreciated by those skilled in the art, while conductive magnetic brush development has been disclosed in order to take advantage of its inherent charge neutralization properties, any scavengeless or non-interactive development may be employed.

While the invention has been described in conjunction with specific embodiments, it is evident to those skilled in the art that many alternatives, modifications and variations will be apparent in light of the foregoing description Accordingly, the invention is intended to embrace all such alternatives, modifications and variations as fall within the spirit and scope of the appended claims.

What is claimed is:

1. A full color xerographic printing system comprising:
   a raster output scanner optical system for generating at least one first modulated beam at a first wavelength and at least one second modulated beam at a second wavelength, said second wavelength being different from said first wavelength,
   a photoreceptor means having a first layer and a second layer, said first layer being sensitive or accessible only to said first wavelength and said second layer being sensitive or accessible only to said second wavelength, and
   xerographic means for charging said photoreceptor means, said xerographic means then exposing areas of said photoreceptor means to neither modulated beam, said first modulated beam, said second modulated beam, or both first modulated beam and second modulated beam, and, after exposure, said xerographic means depositing different color toners on said photoreceptor means in response to exposure of said areas of said layers to said modulated beams, whereby said different color toners produce black and white and all six of the primary colors.

2. The full color xerographic printing system of claim 1 wherein said first layer is sensitive in the red range and said second layer is sensitive in the infrared range.

3. The full color xerographic printing system of claim 1 wherein said first wavelength is approximately 670 nm and said second wavelength is approximately 830 nm.

4. The full color xerographic printing system of claim 1 wherein said raster output scanner optical system comprises a single rotating polygon and single optical system for said first and second modulated beams.

5. The full color xerographic printing system of claim 1 wherein a blanket exposure step is used between toner development stations to change voltage levels between that area of the photoreceptor which was exposed with said first wavelength only and that which was exposed with said second wavelength only to allow subsequent toner development in only one of those two areas.

6. The full color xerographic printing system of claim 1 wherein the light source of said raster output scanner optical system comprises a semiconductor laser wherein one or more modulated beams are emitted at each of the two wavelengths.

7. The full color xerographic printing system of claim 1 wherein said photoreceptor means comprises a photoreceptor drum, said photoreceptor drum having an electrically conductive substrate upon which is said second layer and said first layer.

8. The full color xerographic printing system of claim 1 wherein said xerographic means is a double pass system with a single exposure station.

9. The full color xerographic printing system of claim 8 wherein said single exposure station comprises a common single polygon, single optics raster output scanner optical system in which two or more beams are emitted from a semiconductor laser light source, said semiconductor laser light source being either hybrid or monolithic.

10. The full color xerographic printing system of claim 1 wherein said xerographic means is a single pass system with two exposure stations.

11. The full color xerographic printing system of claim 10 wherein the two exposure stations are addressed each by two beams from a common single polygon, single optics raster output scanner optical system in which four beams are emitted from a semiconductor laser light source, said semiconductor laser light source being either hybrid or monolithic, said four beams being split two beams to each of said two exposure stations by polarization splitting elements or by wavelength splitting elements.

12. The full color xerographic printing system of claim 1 wherein said photoreceptor means comprises a photoreceptor belt, said photoreceptor belt having an electrically conductive substrate upon which is said second layer and said first layer.

13. The full color xerographic printing system of claim 12 wherein said first layer consists of benzimidazole perylene, and said second layer consists of titanyl phthalocyanine.

14. The full color xerographic printing system of claim 13 wherein said first layer comprises a generator layer of benzimidazole perylene and a transport layer of N,N'-diphenyl-N,N'-bis(3''-methylphenyl)-(1,1'-biphenyl)-4,4'-diamine (TPD) in polycarbonate and said second layer comprises a generator layer of titanyl phthalocyanine and a transport layer of N,N'-diphenyl-N,N'-bis(3''-methylphenyl)-(1,1'-biphenyl)-4,4'-diamine (TPD) in polycarbonate.

15. The full color xerographic printing system of claim 14 wherein said generator layer of benzimidazole perylene of said first layer is approximately 0.1 to 1μm thick, said transport layer of TPD in polycarbonate of said first layer is approximately 15μm thick, said generator layer of titanyl phthalocyanine of said second layer is approximately 0.1 to 1μm thick and said transport layer of TPD in polycarbonate of said second layer is approximately 15μm thick.

16. The full color xerographic printing system of claim 15 wherein said first wavelength is approximately 670 nm and said second wavelength is approximately 830 nm.

* * * * *